INVENTORS
GRAYDON L. BROWN &
BOBBY J. THOMAS
BY William J. Miller
ATTORNEY

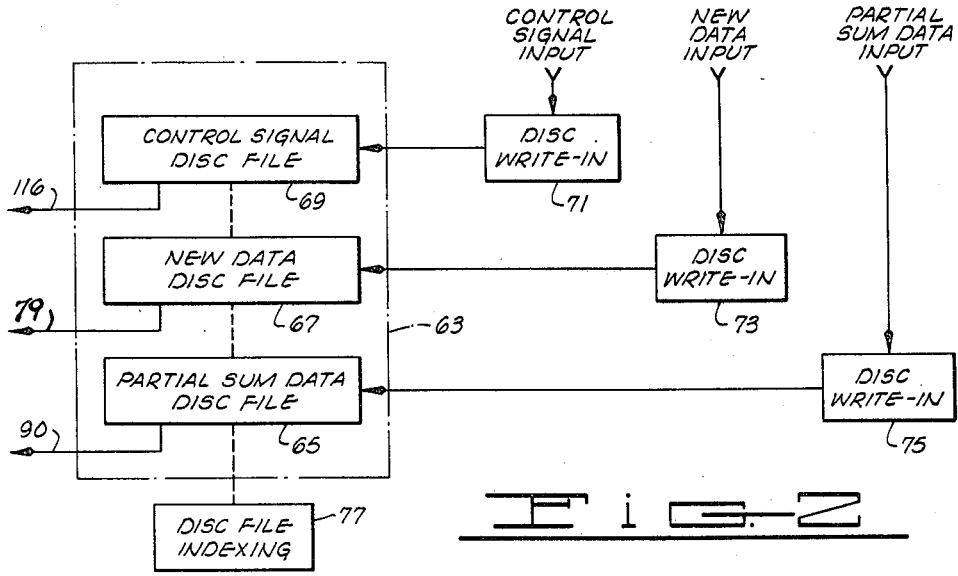
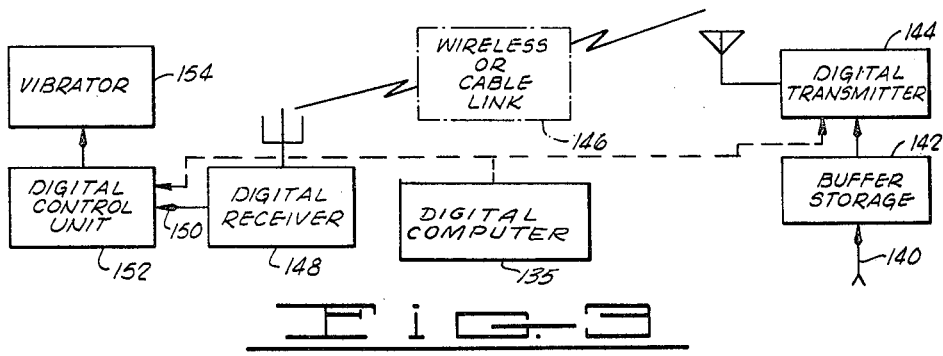
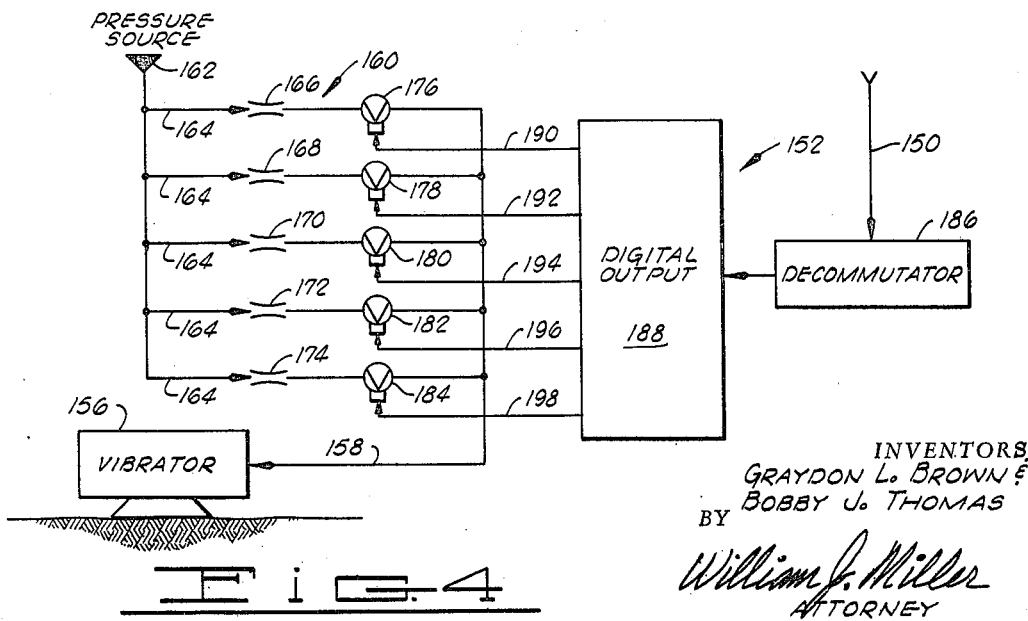
INVENTORS
GRAYDON L. BROWN &
BOBBY J. THOMAS
BY William J. Miller
ATTORNEY

United States Patent Office 3,496,530
Patented Feb. 17, 1970

3,496,530
METHOD AND APPARATUS FOR COMPOSITING SEISMIC DATA
Graydon L. Brown and Bobby J. Thomas, Ponca City, Okla., assignors to Continental Oil Company, Ponca City, Okla., a corporation of Delaware
Filed June 10, 1968, Ser. No. 735,886
Int. Cl. G01v 1/00; G10k 11/00
U.S. Cl. 340—15.5          13 Claims

ABSTRACT OF THE DISCLOSURE

Method and apparatus for compositing a plurality of successively received multi-trace seismic signals utilizing digital techniques wherein each multi-trace seismic signal is multiplexed and converted into a time sequential digital signal and, thereafter, each successive time sequential digital signal is stored and subsequently selectively added to a partial sum of selected previous time sequential digital signals. The apparatus includes plural digital storage assemblies for synchronous recording and playback of an input control signal, seismic new data signals and seismic composite data signals with adding and recycling mechanism for selectively summing desired new data signals into the composite data signals. The apparatus also provides specific means for transmitting a digital control signal for application in controlling generation of seismic input energy to the earth.

BACKGROUND OF THE INVENTION

Field of the invention

The invention relates generally to processing of seismic data and, more particularly, but not by way of limitation, it relates to method and apparatus for compositing successively received seismic signals in digital form.

Description of the prior art

The prior art includes various types of apparatus for compositing seismic data. The prior known systems function with input of either analog or digital seismic data, but such devices which function with digital signals tend to require an exceptionally large amount of storage facility per data handling capability. Previously known vibrational prospecting systems have generally relied on analog techniques for such data recording phases of the operation, and certain digitization procedures of signal processing were only performed in the laboratory on selected data records. One form of prior art teaching as to generally similar signal processing is the subject of U.S. Patent No. 3,340,499. This patent instructs as to method and apparatus for digital composition of an incoming seismic signal directly with a stored previous signal or composite of previous signals.

SUMMARY OF THE INVENTION

The present invention contemplates method and apparatus for digitally recording successive multi-trace seismic signals in composited manner while maintaining selective control over summation of each successive group of data signals. In a more limited aspect, the invention contemplates the employ of first and second storage means which are operative to record and continually sum in selective manner digitized new data signals and partial sum data signals, respectively. Thus, the incoming new data signals are applied to multiplexing and digitizing means whereupon the digital new data output is stored in a first storage means. During a next cycle of operation, the first new data is read out while next successive new data is read in and, simultaneously, the first new data is recorded in another storage means, the partial sum storage. The succession of new data acquisitions and summation of previous new data into storage as partial sum data may be effected a number of times. Further means are provided for digitally storing a vibrational control signal in separate but synchronous relation to each of said new data storage and partial sum data storage, and also for reading out the digital control signal for direct transmission to control a seismic energy source.

Therefore, it is an object of the present invention to provide a method for digital composition of received multi-trace seismic signals wherein each successively received seismic signal can be inspected and/or evaluated for signal content versus noise prior to inclusion into the composite sum of seismic signals.

It is also an object of the invention to provide apparatus for carrying out the selective digital compositing function to improve the signal-to-noise ratio of a multi-trace seismic representation.

It is a further object of the present invention to provide apparatus for digital compositing of vibrational seismic signals in synchronous relationship to the recorded control signal data which represents the vibrational signal input in the earth.

It is yet another object to provide digital signal processing which enables continual development of a technically improved transmitted sweep signal for controlling vibrational input to an earth medium.

It is also an object to provide apparatus for enabling direct control of a seismic source by a transmitted digital control signal.

Finally, it is an object of the present invention to provide digital compositing apparatus which can be employed in the field and which can be coupled for function with existing computer control systems as well as various other digital field equipment.

Other objects and advantages of the invention will be evident from the following detailed description when read in conjunction with the accompanying drawings which illustrate the invention.

BRIEF DESCRIPTION OF THE DRAWINGS

FIG. 2 is a block diagram of one form of storage assembly for use in the circuitry of FIG. 1;

FIG. 3 illustrates an alternative form of control signal link; and

FIG. 4 illustrates one form of digital control unit as used in circuitry of FIG. 3.

DESCRIPTION OF THE INVENTION

Figure 1:
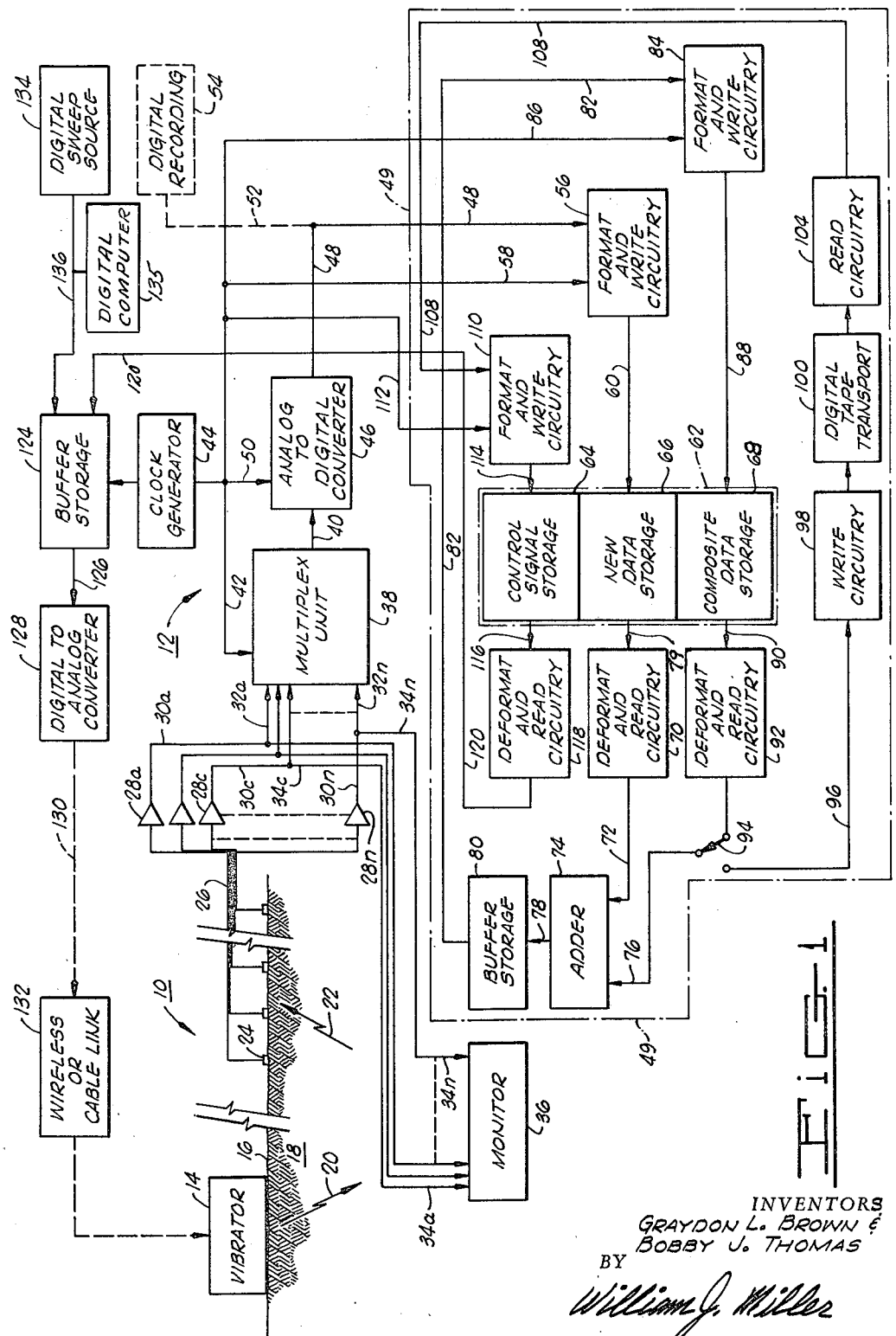
FIG. 1 is an overall block diagram of a vibrational seismic prospecting system including the digital signal compositing capability.

As shown in FIG. 1, a geophysical prospecting system seismic prospecting system including the digital signal processing system 12 to derive any of various types of seismic information. The type and quantity of seismic information may be selected by choice and arrangement of components of the seismic prospecting system 10, as well as by the modes of handling or processing of the received seismic signals.

The prospecting system 10 is depicted as a vibrational seismic sounding system, however, other forms of energy generation device could be employed and gainfully brought to avail of the present invention. Prospecting system 10 consists of a vibrator 14 disposed in energy coupling relationship to a surface 16 of earth medium 18 such that vibratory seismic signals are propagated downward along a path shown generally as arrow 20. The vibrational input energy is optimally controlled to be of predetermined frequency and modulation over a selected period of time as is well known in the art of vibrational seismic prospecting.

Reflecting or refracted vibrational energy is received upward along paths generally designated by arrow 22 where it is detected in each of a plurality of geophones 24 or other equivalent detectors for conduction as an electrical signal along the plural conductor cable 26. The number and location of geophones 24 is a matter of choice depending upon the particular seisphone array which it is desired to employ; however, the following description proceeds with respect to a multi-trace seismic signal which may be, for example, a family of twelve separate seismic traces as derived from twelve spaced geophones 24. It would also be conventional practice to employ one or more vibrators 14 at spaced positions as well as to effect predetermined repositioning of a single vibrator 14.

Each of the individual seismic signals of the family of trace signals in multi-conductor cable 26 is then applied to the input of one of a plurality of amplifiers 28 $a$–$n$ whereupon the reinforced outputs on each of leads 30 $a$–$n$ is in proper condition for application to signal processing system 12. In the case of a twelve trace family then twelve such amplifiers 28 $a$–$n$ and outputs 30 $a$–$n$ would be utilized. Also then, twelve individual inputs 32 $a$–$n$ would be applied to signal processing system 12, and this includes the plurality of parallel signal leads 34 $a$–$n$ which provide inputs to a monitor 36. The monitor 36 can be employed to provide visual operator inspection of a selected one or all of the incoming seismic signals. This is an important function to be considered in conjunction with the present invention as it enables the operator's selection of wanted or unwanted signals, depending upon noise content, prior to their addition into the composite data signal as will be further described in detail.

The multiple input seismic signals on each of inputs 32 $a$–$n$ to processing system 12 are first applied to a multiplex unit 38 of conventional type which performs scanning and combining to provide a time-sequential output on a lead 40. The canning rate of multiplex unit 38 is controlled via a clock input on lead 42 from a clock generator 44 which may be employed as the master timing source to provide synchronizing energization throughout the signal processing system 12. Thus, clock generator 44 is preferably operated to provide a sampling rate output on lead 42 which is selectable between several different frequencies of sampling time or frequency per trace. The time-sequential analog electrical signal on lead 40 is then applied to the input of an analog to digital converter 46 of conventional type to provide a digital signal output on a lead 48 to recorder circuitry 49. The analog to digital converter 46 is rate-controlled by means of a clock input on lead 50 from clock generator 44, this maintaining synchronization between the multiplex and conversion operations. As would be one form of standard practice, the converter 46 may include buffer output such that the digital signal on lead 48 may be a sequence of parallel digital indications, e.g. 12 bit digital words. Also, an option may be exercised to record the parallel digital data by selective application via lead 52 to a digital recording stage 54 shown in dash-lines.

The parallel (12 bit) data on lead 48 may be applied to a format and write circuitry 56 which is controlled by clock pulse input 58 to provide a storage write output in properly formatted arrangement or sequence via line 60. One form of the present invention which proves to function to good advantage would have the format and write circuitry 56 functioning to provide a digital output on line 60 of two serial characters of six bits each; however, any type of format compatible with the selected storage devices is suitable. The digital output on line 60 is applied for write-in on a selected storage portion of a storage member 62. Actually, storage member 62 consists of a control signal storage 64, a new data storage 66, and a composite data 68, and write-in on new data digital signals at line 60 would be placed in new data storage 66. While the storage member 62 is shown as a form of combination device it may well be three separate storage devices but these must be accurately synchronized either electrically or mechanically.

The storage member 62 may be either a tape loop storage system having continuous recording capability, or it could be a disc file storage system utilizing storage discs having continuous magnetic coating. For example, as shown in FIG. 2, a disc storage system 63 may utilize one or more discs for storage or composite or partial sum data in disc file 65, and one or more discs as new data disc file 67, with control signal storage at disc file 69. The digitized control signal, new data and partial sums data are each received at respective disc write-in circuits 71, 73 and 75 for recording in proper ones of disc files 69, 67 and 65. Disc file indexing 77 of well-known design is employed to control synchronism of write-in and read-out from each disc file of disc storage system 63.

Referring again to FIG. 1, new data digital data from new data storage 66 may be read out via line 79 through a selected reformat and read circuitry 70 for application via lead 72 to suitable digital adder circuitry 74. The adder circuitry 74 receives simultaneous input of composite data information via lead 76 (as will be described) whereupon a newly summed composite data is present in digital form on lead 78 to a buffer storage 80. The new partial sum or composite data is then present in digital form on a lead 82 for return and input to format and write circuitry 84 as controlled by a clock input 86 to readin properly formatted digital data on write input 88 to the composite data storage 66. Readout of partial sum data from composite data storage is effected via readout 90 to another similar deformat and read circuitry 92, and this digital output, in turn, may be conducted through a selector switch 94 to input 76 of adder 74. Thus, with each cyclical operation of storage member 62, the partial sum or composite of previous data may be continually (although selectively) added with incoming new digital data to form the new composite data. The selector switch 94 can be actuated at any time to direct composite data information along a lead 96 to write circuitry 98 whereupon it is suitably placed on a digital tape transport 100.

A control signal output from digital tape transport 100 may provide output of specific control signal information as read out via read circuitry 104 for conduction via lead 108 to the input of a format and write circuitry 110. The format and write circuitry 110, controlled in usual manner by a clock input 112, then activates write input 114 to the control signal storage 64. In this manner, a suitable control signal for control of vibrator 14 may be stored in complete synchronism with all new data as well as with the composite data. Readout of control signal data is effected via readout line 116 through deformat and read circuitry 118 whereupon it is present on a line 120 for eventual control of vibrator 14. A selected control signal may remain in control signal storage 64 indefinitely so that the same, optimally derived or constructed control signal will be available for control of vibrator 14 through a plurality of successive vibrator sweeps.

The output 120 from deformat and read circuitry 118 conducts digital control values to a buffer storage 124. Buffer storage 124 also under control of clock generator 44, clocks out control signal digital data via lead 126 to a digital to analog converter 128. The output 130 from converter 128 is the vibrator control signal in analog form and it may then be conveyed by wireless or cable link 132 to the remote vibrator position to control the vibrator 14 in predetermined manner. Although not specifically shown, it is also contemplated that the control signal be transmitted while still in digital form for either conversion at the vibrator site into an analog vibrator drive signal, or application in digital form to a digital signal responsive vibrator drive device. In still other cases, in order to achieve a control signal having optimum characteristics, a control signal in digital form may be derived from a more diverse digital sweep source 134, e.g., a commercially available digital sweep generator, or directly from a digital computer 135, for input on lead 136 to the buffer storage 124.

Optimum digital sample values of the control signal may be generated by a computer program and recorded on a digital tape. Since different types of control signal spectra are required for different locations, a complete suite of control signal replicas may be computer recorded on a library tape and, from the library tape, an individual spectrum could be selected, played back, and stored in the control signal storage 64. This control signal could then be employed for vibrator control indefinitely or at least until data deterioration through playback might have necessitated the restorage of the desired sweep spectrum or a different selected sweep spectrum from the library tape. A change in field conditions will usually dictate change in control signal spectrum in which case a more nearly optimum spectrum can be chosen from the selection available on the library tape, or, a change could be made in an existing computer program to generate a new optimum sweep spectrum.

More detailed teachings relating to digital control of vibrational seismic prospecting are the particular subject matter of a U.S. patent application Ser. No. 559,460, now Patent No. 3,440,599, entitled "Digitally Controlled Vibrational Seismic Prospecting," and filed on June 22, 1966, in the name of Heath et al, as assigned to the present assignee, and a U.S. patent application Ser. No. 594,790, now abandoned, entitled, "Digital System for Controlling a Seismic Vibrator," and filed on Nov. 16, 1966, in the name of Brown et al. as also assigned to the present assignee.

One of the accomplishments of summation or data compositing is to reject noise effects since signal sums linearly and noise sums statistically. However, the noise on one recording cycle or sequence of seismic signals can be so high as to result in a degradation of the entire sum of possibly thirty previous recording cycle times of upwards of thirteen seconds each. If new data is added directly to the partial sum while the new data is arriving, much noise can be added before the operator can react to an increase of noise level. Thus, by storing new data in a separate location as provided by the signal processing system 12, it is possible for the operator to inspect incoming new data on such as monitor 36 and to be able to reject such new data as that which is degraded by excessive noise.

As previously stated, the storage medium 62 may be such as a disc or drum with a continuous magnetic coating, or it may be a tape loop spliced into an endless storage medium and capable of providing continuous or near-continuous recording. The inherent lack of continuity of the tape loop medium may require a conventional form of buffer storage, e.g. a magnetic core, either (a) to store data continuously in order to prevent precession of specific digital sample data with respect to tape medium location, or (b) to move data across the recording gap whenever it is encountered in the cyclical operation.

OPERATION

As shown in FIG. 1, one or more vibrators 14 are positioned in predetermined spaced relationship in energy coupling contact with the earth surface 16; and at a prescribed distance removed therefrom, a plurality of geophones 24 are coupled with earth surface 16 in a desired array of pattern. The vibrator control signal is then applied from an external source to control operation of one or more vibrators 14. The control signal may consist of individual sweeps of typically sinusoidal wave forms frequency modulated at a linear rate of about ten cps per second over a typical frequency range of ten cps to approximately eighty cps. A typical sweep may be on the order of seven seconds duration and recording time for received seismic information should include this seven second period plus an additional six seconds of reflection time. The system is capable of generating the seven second sweeps with virtually no elapsed time between the thirteen second transmit and record cycles; however, manually controlled operation will allow any desired flexibility in the generation of each successive cycle of the transmitted vibrational signal sequence.

The control signal for controlling vibrator 14 is present in control signal storage 64 and it is periodically read out through a deformat and read circuitry 118 through buffer storage 124 and digital to analog converter 128 whereupon it is applied to control vibrator 114. The control signal is applied via lead 108 through a format and write circuitry 110 for recording in the control signal storage in the desired format and in synchronism with received seismic energy data as will be further described. Thus, the control signal may be derived from previously established computer programs or from selected forms of control signal present on a library tape carrying such data (as may be played back through digital tape transport 100); further, the control signal may be a previously recovered sequence of composite data selected through selector switch 94 and lead 96 for application to write circuitry 98 to place it on digital tape transport 100.

Received seismic energy detected from earth medium 18 by geophones 24 is present in multi-wire conductor 26 for amplification in the individual channel amplifiers 28a–28n. The amplifier outputs 38a–34n allow individual inspection of information from each channel by a monitor 36, e.g., a multi-trace oscilloscope, and the parallel outputs 32a–32n apply the detected seismic energy signal to the signal processing system 12. Each cycle of incoming multi-trace seismic data is multiplexed and converted to digital new data in a predetermined format, for example, in twelve bit parallel form. This data is applied through format and write circuitry 56 whereupon it may be converted to two serial characters of six bits each for write-in in the new data storage 66 of storage member 62. The digitally recorded control signal in control signal storage 64 may be in similar format of two serial six bit characters due to the function of format and write circuitry 110. The composite data storage 66 maintains a continuous storage of partial sum data, a partial sum of all selected previous received seismic signals, each channel being separately maintained, and the partial sum being maintained through format and write circuitry 84 in format compatible with the new data for continuous summing and updating.

It should be apparent then that each incoming cycle or sequence of received seismic energy can be observed by the operator at monitor 36 during its reception and placement in the new data storage 66, this being prior to any commitment to add it into the partial sum. If the operator observes excessive seismic noise e.g., due to road or air traffic, etc., or other peculiarities of the signal appearance, he may actuate processing system 12 so that that sequence of new data is dumped or withheld from summation into the partial sum data. The next cycle of incoming seismic signals may then appear to be a much more faithful representation of energy return and these and probably the majority of others would be enabled for inclusion in the partial sum data in composite data storage 66.

As shown in FIG. 3, an alternative control signal practice enables wire or wireless transmission of a digitized control signal with direct application to energize a seismic energy source. Thus, a digitized control signal as read out from control signal storage 64 (FIG. 1) may be applied at input 140 through a conventional type of buffer storage 142 for input to a digital transmitter 144. The output from digital transmitter 144 is then propagated by either cable or wireless link as shown generally by dash-line block 146 for reception by a digital receiver 148. Digital signal output on lead 150 from digital receiver 148 is then applied directly to a digital control unit 152 which energizes vibrator 154 to produce a predetermined seismic energy output. The digital computer 135 may provide the digital signal source for application at either the transmission or reception site.

One form of digital control unit 152 which is suitable for use with a hydraulically driven vibrator is shown in FIG. 4. Control unit 152 provides a means whereby an electrical command in digital form is equated to an analog form, the velocity of pressurizing flow applied to energize a hydraulic vibrator 156. Thus, vibrator 156 is connected via pressure input conduit 158 and a flow control network 160 to a suitable hydraulic pressure source 162 which may consist of the usual, pump, reservoir and circulating controls (not specifically shown). Input to control network 160 from pressure source 162 applies pressure on each of the parallel conduits 164 to respective orifices 166, 168, 170, 172 and 174. The orifices 166–174 are formed to have differing areas which are binarily weighted in decreasing significance in a ratio of, i.e., for the case of five such digital positions, 16–8–4–2–1 such that selective control of passage of fluid material through orifices 166–174 will enable an analog flow variation on input conduit 158 to drive vibrator 156.

Each of orifices 166–174 is controlled by a respective one of suitable fast-switching valves 176, 178, 180, 182 and 184 which control pressurized fluid flow through conduit 158 to the vibrator 156. The digital control input from receiver 148 (FIG. 3) via lead 150 is first de-mutliplexed or properly arranged as to serial-parallel order by a decommutator circuit 186 and this control output is then applied to a digital output circuit 188. The output circuit 188 provides a plurality of valve control outputs 190, 192, 194, 196 and 198 for continually actuating respective ones of fast-switching valves 178–184 in accordance with the digital command program. The fast-switching valves 178–184 may take various forms so long as they give a linear response to a control input.

The foregoing discloses a novel system for processing seismic signals in such manner as to greatly improve the signal-to-noise ratio. The system has the capability of continually compositing a partial sum; however, the system interjects the capability of providing visual inspection of new data prior to any commitment for its inclusion in the continuing sum. Thus, the eventuality that one faulty multi-trace seismic signal can spoil an entire plurality of shot sequences is virtually eliminated, the control effectively residing in the operator. The system further utilizes plural record digital recording mechanism which provides further flexibility as to the selectivity and summation of received seismic signals while maintaining continuous synchronism with related seismic input control signals.

Changes may be made in the combination and arrangement of steps or elements as heretofore set forth in the specification and shown in the drawings; it being understood that changes may be made in the embodiments disclosed without departing from the spirit and scope of the invention as defined in the following claims.

What is claimed is:

1. Method of compositing successive ones of sequentially received multi-trace seismic signals as a continuing partial sum of selected new data, comprising the steps of:
   converting each seismic signal into digital signals and storing them in a first storage position as new data;
   storing a partial sum of selected previous seismic signal new data digital signals in a second storage position as partial sum data;
   recalling stored new data digital signals from said first storage position for selective summation and at the same time storing the next new data digital signals;
   recalling stored partial sum digital signals from said second storage position for summation and at the same time storing next successive partial sum digital signals; and
   selectively summing said recalled new data digital signals with said recalled partial sum digital signals to form said next successive partial sum digital signals.

2. A method of compositing as set forth in claim 1 which is further characterized to include the step of:
   observing incoming new data digital signals to check for desirability of compositing and selectively enabling said new data digital signals for summing with said partial sum digital signals.

3. A method of seismic prospecting comprising the steps of:
   deriving a control signal having predetermined frequency and amplitude characteristics;
   controlling the seismic vibrator in accordance with said control signal to impart a sequence of vibrational seismic energy outputs having characteristic frequency content into an earth medium;
   detecting received seismic energy from each successive vibrator output as a series of new data multi-trace seismic signals;
   converting each of said multi-trace new data seismic signals to a time sequential new data digital signal;
   digitally recording each of the successively received new data digital signals in a first storage position while reading out stored previous new data from the same storage position;
   summing said readout previous new data with selected partial sum data for digital recording on a second storage position while reading out said previous partial sum data signals for said summation with said previous new data digital signals;
   digitizing and recording said control signal for each output sequence at a third storage position in synchronism with said new data digital signals and said partial sum data digital signals derived for each vibrator output sequence.

4. A method as set forth in claim 3 which is further characterized in that:
   said digitized and recorded control signal is played back and applied directly as a digital signal to control said seismic vibrator.

5. Apparatus for compositing successive ones of sequentially received multi-trace seismic signals as a continuing partial sum of selected new data, comprising:
   converter means received each seismic signal and converting it into a new data digital signal;
   first storage means receiving said new data digital signal in storage as new data;
   second storage means receiving a continuing partial sum of selected seismic signal previous data digital signals in storage as partial sum data;
   new data read out and receive means for reading out digital signals of previous data from said first storage means for selective summation while said new data is received by said first storage means;
   partial sum data readout and receive means for reading out digital signals of previous partial sum data from said storage means for summation while said partial sum data is received by said second storage means; and
   means for summing said read out previous data digital signals with said read out previous partial sum digital signals to form said continuing partial sum of selected previous ones of said new data digital signals for input to said second storage means.

6. Apparatus for compositing as set forth in claim 5 wherein said first and second storage means each comprise:
   digital recording means;
   digital writing mean for recording digital information on said digital recorder means;
   formatting means receiving said data digital signal for application to said digital write means; and
   timing means for controlling said formatting means and said digital write means to apply said data digital signal for recording on said digital recording means.

7. Apparatus for compositing as set forth in claim 6 which is further characterized to include:
  seismic signal generation means in energy-coupling contact with an earth medium to impart seismic signal energy thereto; and
  a source of digital control signal having predetermined characteristics of frequency and duration for application to control said seismic energy generator.

8. Apparatus as set forth in claim 7 wherein said source of digital control signal comprises:
  computer means which is programmable to provide said control signal digital output having selected signal parameters; and
  control means receiving said computer means digital output and applying it to control said seismic signal generation means.

9. Apparatus as set forth in claim 8 wherein said seismic signal generation means comprises:
  a source of hydraulic power; and
  hydraulic vibrator means energized by said source of power in accordance with control of said digital control signal.

10. Apparatus as set forth in claim 9 wherein said control means comprises:
  a plurality of conduits having orifices of different binary weighted area, each conduit being connected in parallel between said hydraulic power source and said hydraulic vibrator means;
  plural switching valve means controlling flow through each of said conduits; and
  digital output means receiving said digital control signal and providing actuating signal output to selected ones of said plural switching valve means.

11. Apparatus as set forth in claim 7 wherein said source of digital control signal comprises:
  third storage means containing said control signal digitally recorded thereon and being actuatable in synchronism with said first and second storage means to playback said digital control signal; and
  control means receiving said digital control signal and applying it to control said seismic signal generation means.

12. Apparatus as set forth in claim 11 wherein said seismic signal generation means comprises:
  a source of hydraulic power; and
  hydraulic vibrator means energized by said source of power in accordance with control of said digital control signal.

13. Apparatus as set forth in claim 12 wherein said control means comprises:
  a plurality of conduits having orifices of different binary weighted area, each conduit being connected in parallel between said hydraulic power source and said hydraulic vibrator means;
  plural fast-switching valve means controlling flow through each of said conduits; and
  digital output means receiving said digital control signal and providing actuating signal output to selected ones of said plural fast-switching valve means.

References Cited

UNITED STATES PATENTS

| | | | |
|---|---|---|---|
| 3,262,095 | 7/1966 | Wells et al. | 340—15.5 |
| 3,340,499 | 9/1967 | Hadley et al. | 340—15.5 |

RODNEY D. BENNETT, Jr., Primary Examiner

D. C. KAUFMAN, Assistant Examiner

U.S. Cl. X.R.

181—.5